(12) United States Patent
Hu

(10) Patent No.: US 11,139,518 B2
(45) Date of Patent: Oct. 5, 2021

(54) BATTERY PACK

(71) Applicant: NINGDE AMPEREX TECHNOLOGY LIMITED, Ningde (CN)

(72) Inventor: Dongge Hu, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 167 days.

(21) Appl. No.: 16/445,486

(22) Filed: Jun. 19, 2019

(65) Prior Publication Data

US 2020/0185664 A1   Jun. 11, 2020

(30) Foreign Application Priority Data

Dec. 10, 2018   (CN) .......................... 201811503358.0

(51) Int. Cl.
| | |
|---|---|
| H01M 50/116 | (2021.01) |
| B65D 75/20 | (2006.01) |
| H01M 10/0565 | (2010.01) |
| H01M 50/557 | (2021.01) |
| H01M 50/119 | (2021.01) |
| H01M 10/058 | (2010.01) |
| H01M 50/131 | (2021.01) |

(52) U.S. Cl.
CPC .......... *H01M 50/116* (2021.01); *B65D 75/20* (2013.01); *H01M 10/058* (2013.01); *H01M 10/0565* (2013.01); *H01M 50/119* (2021.01); *H01M 50/557* (2021.01); *H01M 50/131* (2021.01)

(58) Field of Classification Search
CPC combination set(s) only.
See application file for complete search history.

(56) References Cited

U.S. PATENT DOCUMENTS

2015/0140371 A1   5/2015   Slocum

FOREIGN PATENT DOCUMENTS

| CN | 1322385 A | 1/2001 |
|---|---|---|
| CN | 101490870 A | 7/2009 |
| CN | 105322133 A | 2/2016 |

(Continued)

OTHER PUBLICATIONS

Chinese First Office Action dated Jan. 6, 2021 in counterpart application CN201811503358.0, 8 pages in Chinese.

*Primary Examiner* — Ula C Ruddock
*Assistant Examiner* — Sarika Gupta
(74) *Attorney, Agent, or Firm* — Juan Carlos A. Marquez; Marquez IP Law Office, PLLC

(57) ABSTRACT

A battery pack includes: a packaging housing, including a first arcuate plate and a second arcuate plate, an inner arcuate surface of the first arcuate plate being opposite to an outer arcuate surface of the second arcuate plate; and at least one set of electrode assemblies, comprising a first arcuate electrode assembly and a second arcuate electrode assembly, the first arcuate electrode assembly is disposed on the inner arcuate surface of the first arcuate plate, the second arcuate electrode assembly is disposed on the outer arcuate surface of the second arcuate plate, the inner arcuate surface of the first arcuate electrode assembly and the outer arcuate surface of the second arcuate electrode assembly face to each other, and a first spacing is defined between the inner arcuate surface of the first arcuate electrode assembly and the outer arcuate surface of the second arcuate electrode assembly.

18 Claims, 6 Drawing Sheets

(56) References Cited

FOREIGN PATENT DOCUMENTS

| | | | |
|---|---|---|---|
| CN | 105580157 | A | 5/2016 |
| CN | 106415877 | A | 2/2017 |
| CN | 206163532 | U | 5/2017 |
| CN | 107636887 | A | 1/2018 |
| CN | 107810569 | A | 3/2018 |
| KR | 20160040931 | A | 4/2016 |
| KR | 20160063043 | A | 6/2016 |
| WO | 2015057643 | A1 | 4/2015 |

BATTERY PACK

CROSS REFERENCE TO RELATED APPLICATIONS

The present application claims the benefit of priority from the China Patent Application No. 201811503358.0, filed on 10 Dec. 2018, the disclosure of which is hereby incorporated by reference in its entirety.

BACKGROUND

1. Field of the Invention

Embodiments of the present application relates to the technical field of electrochemical devices, and in particular to packaging of arcuate electrode assemblies.

2. Description of the Related Art

The following descriptions and examples shall not be considered as prior art as they are included in this part.

Electrochemical devices (for example, lithium-ion batteries) have entered our daily life with the progress of science and technology and the increase of environmental protection requirements. Generally, lithium-ion batteries are rectangular. With the popularization of lithium-ion batteries, the demand for wearable devices increases. In order to meet the requirements of human body structure features, it is necessary to develop arcuate electrode assemblies with a certain curvature, and battery packs thereof.

Because the arcuate electrode assembly not only changes in thickness, but also changes in curvature in use, in order to make more efficient use of the system space, it is necessary to further improve the battery pack and packaging structure.

SUMMARY

In view of the problems in the prior art, one of the objectives of the present application is to provide a battery pack that optimizes the utilization of the system space.

Some embodiments of the present application provide a battery pack, comprising a packaging housing and at least one set of electrode assemblies. The packaging housing comprises a first arcuate plate and a second arcuate plate, wherein the inner arcuate surface of the first arcuate plate is facing the outer arcuate surface of the second arcuate plate. The electrode assemblies comprise a first arcuate electrode assembly and a second arcuate electrode assembly, wherein the first arcuate electrode assembly is disposed on the inner arcuate surface of the first arcuate plate, the second arcuate electrode assembly is disposed on the outer arcuate surface of the second arcuate plate, the inner arcuate surface of the first arcuate electrode assembly and the outer arcuate surface of the second arcuate electrode assembly are opposite to each other, and a first spacing exists between the inner arcuate surface of the first arcuate electrode assembly and the outer arcuate surface of the second arcuate electrode assembly.

According to some embodiments of the present application, the first spacing is about 2.5% to about 30% of the sum of the thickness of the first arcuate electrode assembly and the thickness of the second arcuate electrode assembly. In some embodiments of the present application, the first spacing is about 5% to about 20% of the sum of the thickness of the first arcuate electrode assembly and the thickness of the second arcuate electrode assembly.

According to some embodiments of the present application, the thickness of the first arcuate electrode assembly and the thickness of the second arcuate electrode assembly are respectively about 1 mm to about 10 mm. In some embodiments of the present application, the thickness of the first arcuate electrode assembly and the thickness of the second arcuate electrode assembly are respectively about 2 mm to about 6 mm.

According to some embodiments of the present application, the battery pack further comprises a plurality of sets of electrode assemblies disposed abreast along the arc length direction within the packaging housing, wherein each of the plurality of sets of electrode assemblies has a second spacing from its adjacent set of the electrode assembles in the arc length direction.

According to some embodiments of the present application, the second spacing is about 1 mm to about 15 mm. In some embodiments of the present application, the second spacing is about 3 mm to about 8 mm.

According to some embodiments of the present application, the curvature radius of the first arcuate electrode assembly and the second arcuate electrode assembly are at least about 15 mm. In some embodiments of the present application, the curvature radius of the first arcuate electrode assembly and the second arcuate electrode assembly are at least about 20 mm.

According to some embodiments of the present application, the curvature of the first arcuate electrode assembly matches the curvature of the first arcuate plate, and the curvature of the second arcuate electrode assembly matches the curvature of the second arcuate plate.

According to some embodiments of the present application, the packaging housing further comprises a wing portion combining the first arcuate plate and the second arcuate plate, and the first arcuate plate, the second arcuate plate and the wing portion define openings on the both sides of the packaging housing.

According to some embodiments of the present application, the battery pack further comprises a cover plate, and the cover plate covers one side opening of the packaging housing, wherein the first arcuate electrode assembly and the second arcuate electrode assembly each comprises at least one tab, and the at least one tab is electrically connected with a protection plate on the cover plate.

According to some embodiments of the present application, the first arcuate electrode assembly and the second arcuate electrode assembly respectively comprise: a cathode, an anode and a separator disposed between the cathode and the anode.

Through the packaging structure design of the battery pack in the present application, the first arcuate electrode assembly is disposed on the inner arcuate surface of the first arcuate plate, the second arcuate electrode assembly is disposed on the outer arcuate surface of the second arcuate plate, the inner arcuate surface of the first arcuate electrode assembly is opposite to the outer arcuate surface of the second arcuate electrode assembly, and a thickness expansion space for the arcuate electrode assemblies in the battery pack during cycles is reserved, such that the difference in thickness change at different positions of the arcuate electrode assemblies during charge-discharge cycles is overcome, the utilization of space in the battery pack is optimized, the unit energy density of the battery pack is improved and the safety of the battery pack during cycles can be enhanced.

BRIEF DESCRIPTION OF THE DRAWINGS

The drawings necessary to describe the embodiments of the present application or the existing technology will be briefly described below in order to facilitate the description of the embodiments of the present application. Obviously, the drawings described below are only partial embodiments of the present application. For those skilled in the art, the drawings of other embodiments can still be obtained according to the structures illustrated in these drawings without contributing any inventive efforts.

DETAILED DESCRIPTION

Figure 1:
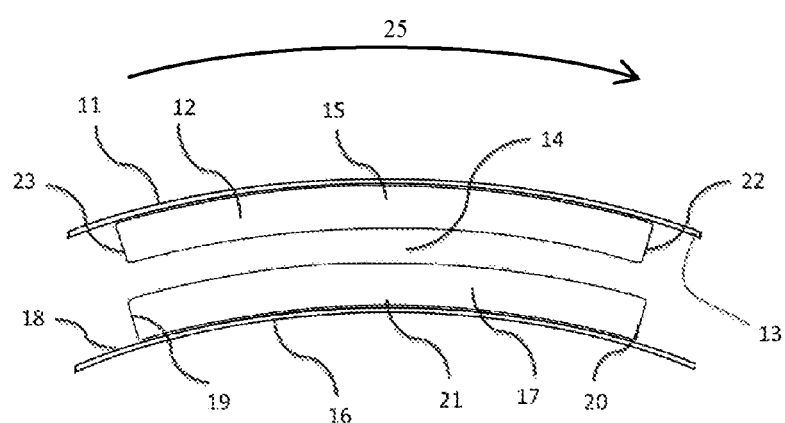
FIG. 1 illustrates a cross-sectional structural schematic view of a battery pack along the arc length direction of a packaging housing according to some embodiments of the present application.

Embodiments of this application are described below in detail. Throughout the entire specification of this application, same or similar components or components having same or similar functions are represented by using similar reference numerals. The embodiments related to the accompanying drawings that are described herein are illustrative and schematic, and are used to provide basic understanding for this application. The embodiments of this application should not be construed as limitations to this application.

In the present description, unless specifically designated or defined, relativistic wordings such as "in arc length direction", "central", "longitudinal", "lateral", "front", "rear", "right", "left", "internal", "external", "lower", "higher", "horizontal", "vertical", "higher than", "lower than", "above", "below", "top", "bottom" and derivative wordings thereof (such as "horizontally", "downwards", "upwards") should be construed as referenced directions described in discussion or shown in the accompanying drawings. These relativistic wordings are merely for ease of description, and do not require constructing or operating this application in a particular direction.

In addition, amounts, ratios and other numerical values are sometimes presented herein in a range format. It should be understood that such range formats are for convenience and brevity, should be interpreted with flexibility, and include not only those numerical values which are specifically designated as being limited in scope, but also include all individual numerical values or sub-ranges which are within the range, as if specifically designating each numerical value and sub-range.

Moreover, for ease of description, "first", "second", "third" and the like may be used herein to distinguish different components of one diagram or a series of diagrams. Unless specifically specified or defined, "first", "second", "third" and the like are not intended to describe corresponding components.

As used herein, the term "about" is used for describing and explaining a small variation. When being used in combination with an event or a case, the terms can refer to an example in which the event or case exactly occurs, or an example in which the event or case similarly occurs. For example, when being used in combination with a value, the terms may refer to a variation range being less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In addition, amounts, ratios, and other numerical values are sometimes presented herein in a range format. It should be understood that such range formats are for convenience and brevity, and should be interpreted with flexibility, and include not only those numerical values that are specifically designated as range limitations, but also include all individual numerical values or sub-ranges that are within the range, as each value and sub-range is specified explicitly.

At present, packaging of arcuate electrode assemblies is mostly single arcuate electrode assembly packaging. However, during the cyclic process of the arcuate electrode assemblies, the thickness of different portions of the electrode assemblies has variable expansion amounts, and the packaging housing for packaging a single arcuate electrode assembly often needs to be reserved with a larger space in the thickness direction of the arcuate electrode assembly.

The embodiment of the present application provides a battery pack formed by packaging arcuate battery assemblies, which comprises at least one set of electrode assemblies and a packaging housing, wherein the electrode assemblies comprise two arcuate electrode assemblies which are respectively disposed on two opposite arcuate plates of the packaging housing in a manner of being opposite to each other, and the at least one set of electrode assemblies are fixed onto the packaging housing, such that a spacing exists between the two opposite arcuate electrode assemblies. When the at least one set of arcuate electrode assemblies are in charge-discharge cycles, the expansion amounts (expansion thicknesses) at different positions in the arcuate electrode assemblies attached to the inner arcuate surface and the outer arcuate surface of the arcuate plates will be different. The battery pack provided by the present application can effectively utilize the variable expansion amounts of the thickness of each position of the arcuate electrode assemblies on the inner arcuate surface or outer arcuate surface in the packaging housing by respectively arranging the arcuate electrode assemblies on the corresponding inner arcuate surface and the outer arcuate surface in the packaging housing, such that the expansion portion of the thickness of the arcuate electrode assemblies can be evenly distributed in the reserved spacing, the waste of the inner space of the battery pack is avoided, and the unit energy density of the battery pack is further improved.

The technical advantages of the battery pack provided by the present application will be described below with reference to FIG. 1. FIG. 1 illustrates a cross-sectional structural schematic view of a battery pack along the arc length direction of a packaging housing according to some embodiments of the present application.

As illustrated in FIG. 1, the battery pack comprises a packaging housing and at least one set of two opposite electrode assemblies. The packaging housing is curved along an arc length direction 25 and comprises a first arcuate plate 11 and a second arcuate plate 16, wherein the inner arcuate surface 13 of the first arcuate plate 11 is opposite to the outer arcuate surface 18 of the second arcuate plate 16. The electrode assemblies comprise a first arcuate electrode assembly 12 and a second arcuate electrode assembly 17. Specifically, the first arcuate electrode assembly 12 is disposed on the inner arcuate surface 13 of the first arcuate plate 11, and the second arcuate electrode assembly 17 is disposed on the outer arcuate surface 18 of the second arcuate plate 16, wherein the inner arcuate surface of the first arcuate electrode assembly 12 and the outer arcuate surface of the second arcuate electrode assembly 17 are opposite to each other, and a first spacing 14 exists between the inner arcuate surface of the first arcuate electrode assembly 12 and the outer arcuate surface of the second arcuate electrode assembly 17.

Figure 2:
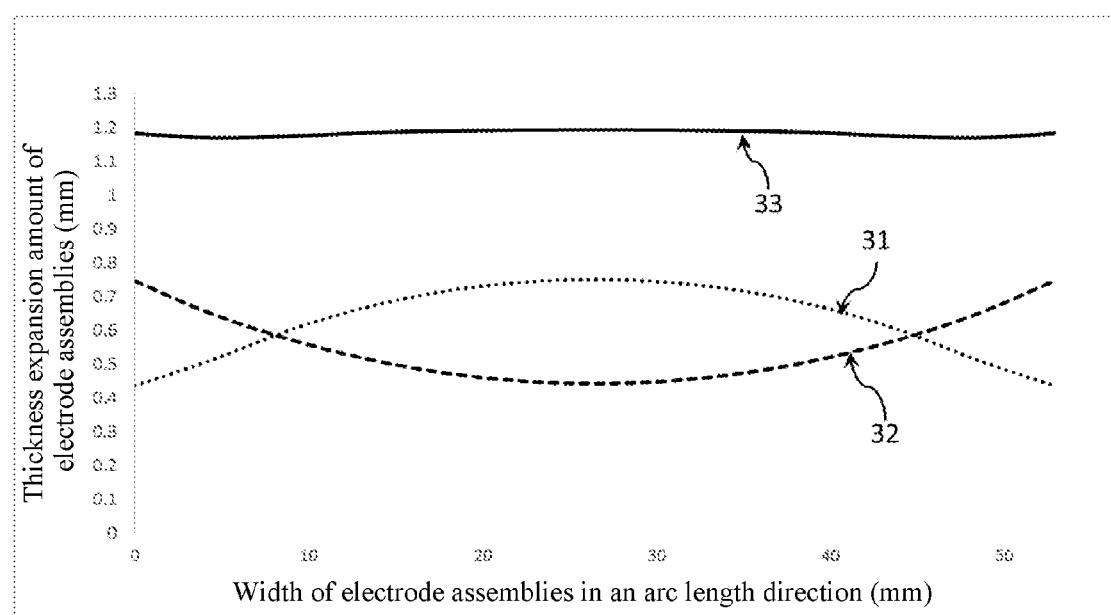
FIG. 2 illustrates a curve chart of thickness expansion amounts of arcuate electrode assemblies at the width along the arc length direction according to the embodiments of the present application.

Because of the electrochemical reaction in the electrode assemblies, the thickness of the first arcuate electrode assembly 12 and the thickness of the second arcuate electrode assembly 17 gradually increase in the charge-discharge cycle of the battery. The thickness expansion change of the arcuate electrode assemblies in the battery pack in the embodiment of the present application will be described below with reference to FIG. 2. FIG. 2 illustrates a curve chart of thickness expansion amounts of arcuate electrode assemblies at the width along the arc length direction according to one specific embodiment of the present application, including: a thickness expansion amount curve 31 of the arcuate electrode assembly 12 at the width along the arc length direction 25, a thickness expansion amount curve 32 of the second arcuate electrode assembly 17 at the width along the arc length direction 25, and a sum curve 33 of the thickness expansion amounts of the two electrode assemblies, wherein both the width of the first arcuate electrode assembly 12 and the width of the second arcuate electrode assembly 17 are 52.9 mm.

As illustrated in FIG. 2, for the thickness expansion amount curve 31 of the first arcuate electrode assembly 12 disposed on the inner arcuate surface 13 of the first arcuate plate 11 at the width along the arc length direction 25, since the arcuate surface of the arcuate electrode assembly tends to be a flat surface after cyclic expansion, the thickness expansion amount of the central portion 15 of the first arcuate electrode assembly 12 relative to the arcuate plate 11 is greater than that of the two endpoint portions 22 and 23. Relatively, for the thickness expansion amount curve 32 of the second arcuate electrode assembly 17 at the width along the arc length direction 25, since the arcuate surface of the arcuate electrode assembly tends to be a flat surface after cyclic expansion, the thickness expansion amount of the two endpoint portions 19 and 20 of the second arcuate electrode assembly 17 relative to the arcuate plate 18 is greater than that of the central portion 21. Herein, after summing the expansion amounts of the first arcuate electrode assembly 12 and the second arcuate electrode assembly 17 in the arc length direction, the sum curve 33 of the expansion amounts presents a uniform horizontal line in the arc length direction, which represents that the thickness expansion amount of each portion of the first arcuate electrode assembly 12 and the second arcuate electrode assembly 17 can complement each other exactly, and the inner arcuate surface of the first arcuate electrode assembly 12 and the outer arcuate surface of the second arcuate electrode assembly 17 are approximately parallel after cyclic expansion, such that the space of the battery pack can be effectively utilized, and thus the waste of space caused by uneven thickness expansion at partial positions of the electrode assemblies is avoided.

According to some embodiments of the present application, the first spacing 14 is about 2.5% to about 30% of the sum of the thickness of the first arcuate electrode assembly 12 and the thickness of the second arcuate electrode assembly 17, wherein the thickness of the first arcuate electrode assembly 12 and the thickness of the second arcuate electrode assembly 17 are the distances between the two surfaces in the respective thickness direction perpendicular to the arc length direction 25 under the condition of no charge-discharge cycle expansion. In some embodiments of the present application, the thickness of the first arcuate electrode assembly 12 and the thickness of the second arcuate electrode assembly 17 are respectively about 1 mm to about 10 mm. In other embodiments of the present application, the thickness of the first arcuate electrode assembly 12 and the thickness of the second arcuate electrode assembly 17 are respectively about 2 mm to about 6 mm.

It should be understood that the size of the first spacing 14 varies depending on the thickness and expansion rate of the electrode assemblies. For example, the expansion coefficient of the electrode assemblies in the battery pack may increase with the increase of the thickness thereof. Those skilled in the art may adjust the size of the first spacing 14 according to the electrode assemblies actually used, without being restricted thereby. In some embodiments of the present application, the first spacing 14 is about 5% to about 20% of the sum of the thickness of the first arcuate electrode assembly 12 and the thickness of the second arcuate electrode assembly 17.

For example, in a specific embodiment of the present application, the thickness of the first arcuate electrode assembly 12 and the thickness of the second arcuate electrode assembly 17 in the battery pack both are 4.9 mm, and the size of the first spacing 14 between the first arcuate electrode assembly 12 and the second arcuate electrode assembly 17 is 1.2 mm, wherein after the battery pack undergoes a plurality of times of charge-discharge cycles, the thickness expansion amount of the central portion 15 of the first arcuate electrode assembly 12 is 0.588 mm, and the thickness expansion amount of the central portion 21 of the second arcuate electrode assembly 17 is 0.343 mm, and the sum of the thickness expansion amounts of the central portions of the two electrode assemblies is 0.931 mm correspondingly, the thickness expansion amount of the two endpoint portions 22 and 23 of the first arcuate electrode assembly 12 is 0.343 mm, and the thickness expansion amount of the two endpoint portions 19 and 20 of the second arcuate electrode assembly 17 is 0.588 mm, and the sum of the thickness expansion amounts of the two endpoint portions of the two electrode assemblies is 0.931 mm. The first arcuate electrode assembly 12 and the second arcuate electrode assembly 17 have the consistent thickness expansion amounts at the central portions and two endpoint portions thereof, which are less than the size of the pre-set first spacing 14, such that the packaging housing will not be burst or deformed due to insufficient expansion space of the electrode assembly after a plurality of times of charge-discharge cycles of the battery pack.

Although the battery pack illustrated in FIG. 1 comprises only one set of electrode assemblies, those skilled in the art should understand that the electrode assemblies in FIG. 1 are only exemplary embodiments provided for describing the electrode assemblies and packaging housing in the battery pack in the present application. In some embodiments of the present application, the battery pack may comprise one or more set of electrode assemblies disposed abreast along the arc length direction 25 of the packaging housing. The present application will be better described below in conjunction with specific embodiments.

FIG. 3 to FIG. 9 illustrate embodiments of packaging processes of the battery pack according to some embodiments of the present application. Those skilled in the art should understand that the embodiments in FIG. 3 to FIG. 9 are only exemplary embodiments for describing the packaging process of the battery pack of the present application. The shapes, sizes and scales of the components in FIG. 3 to FIG. 9 are for the sake of description, may be adjusted and replaced according to practical application, and are not limitations to the present application.

Figure 3:
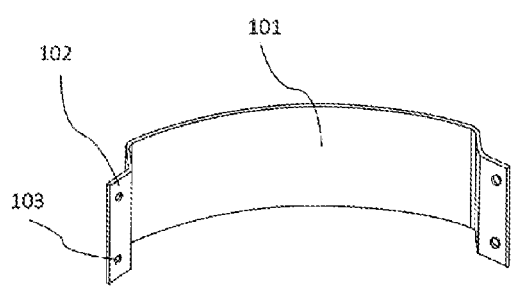
FIG. 3 illustrates a structural schematic view of a first arcuate plate according to some embodiments of the present application.
Figure 4:
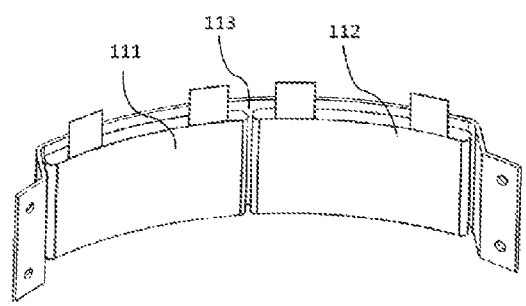
FIG. 4 illustrates a structural schematic view of first arcuate electrode assemblies disposed on a first arcuate plate according to some embodiments of the present application.

FIG. 3 illustrates a structural schematic view of a first arcuate plate according to some embodiments of the present application. FIG. 4 illustrates a structural schematic view of first arcuate electrode assemblies disposed on a first arcuate plate according to some embodiments of the present application.

As illustrated in FIG. 3 and FIG. 4, firstly the first arcuate plate comprises an inner arcuate surface 101 portion used for arranging the first arcuate electrode assemblies, extension portions 102 on the both sides in the arc length direction of the packaging housing, and screw holes 103 used for fixing the extension portions. The first arcuate electrode assemblies 111 and 112 are disposed abreast on the inner arcuate surface 101 of the first arcuate plate along the arc length direction of the first arcuate plate, wherein the first arcuate electrode assemblies 111 and 112 may be fit and fixed by means including, but not limited to, binder or double-sided adhesive. The first arcuate electrode assemblies 111 and 112 may be tightly pressed against the inner arcuate surface 101 of the first arcuate plate at a certain pressure by adopting a profiling tool in the fitting process to form the upper half portion of the battery pack. Herein, a second spacing 113 exists between the first arcuate electrode assembly 111 and an adjacent first arcuate electrode assembly 112, and the second spacing 113 is about 1 mm-15 mm. The second spacing 113 can prevent the width expansion of the first arcuate electrode assembly in the arc length direction during cycles from squeezing the adjacent first arcuate electrode assembly. In some embodiments of the present application, the second spacing 113 is about 3 mm-8 mm.

Figure 5:
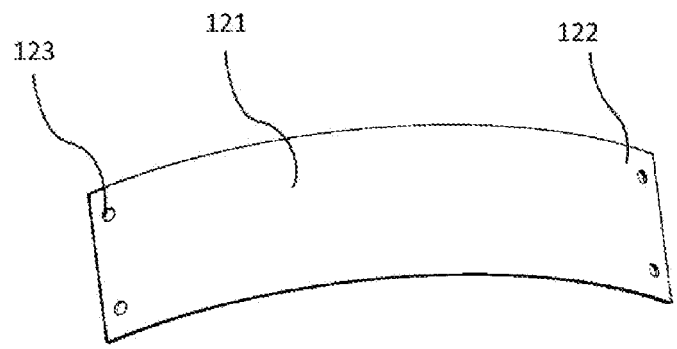
FIG. 5 illustrates a structural schematic view of a second arcuate plate according to some embodiments of the present application.
Figure 6:
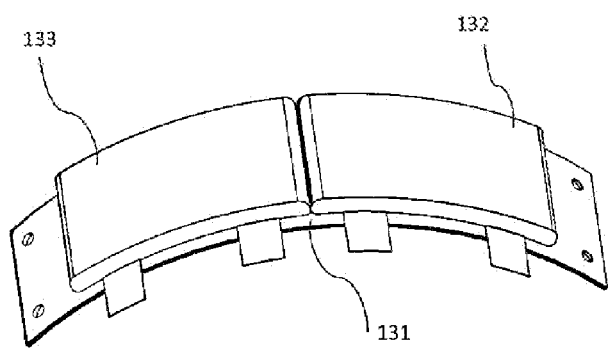
FIG. 6 illustrates a structural schematic view of second arcuate electrode assemblies disposed on a second arcuate plate according to some embodiments of the present application.

FIG. 5 illustrates a structural schematic view of a second arcuate plate according to some embodiments of the present application. FIG. 6 illustrates a structural schematic view of second arcuate electrode assemblies disposed on a second arcuate plate according to some embodiments of the present application.

As illustrated in FIG. 5 and FIG. 6, the second arcuate plate comprises an outer arcuate surface 121 portion used for arranging the second arcuate electrode assemblies, extension portions 122 on both sides in the arc length direction of the packaging housing, and screw holes 123 used for fixing the extension portions on both sides. The second arcuate electrode assemblies 132 and 133 are disposed abreast on the outer arcuate surface 121 of the second arcuate plate along the arc length direction of the second arcuate plate, wherein the second arcuate electrode assemblies 132 and 133 may be fit and fixed by means similar to that for the first arcuate electrode assemblies 111 and 112, including, but not limited to, binder or double-sided adhesive. The second arcuate electrode assemblies 132 and 133 may be tightly pressed against the outer arcuate surface 121 of the second arcuate plate at a certain pressure by adopting a profiling tool in the fitting process to form the lower half portion of the battery pack. Herein, a third spacing 131 exists between the second arcuate electrode assembly 132 and an adjacent second arcuate electrode assembly 133, and the third spacing 131 is about 1 mm-15 mm. The third spacing 131 can prevent the width expansion of the second arcuate electrode assembly in the arc length direction during cycles from squeezing the adjacent second arcuate electrode assembly. In some embodiments of the present application, the third spacing 131 is about 3 mm-8 mm. In some embodiments of the present application, the third spacing 131 may be configured to be the same as or different from the second spacing 113 in FIG. 4 according to the actual needs.

In some embodiments of the present application, the first arcuate plate and the second arcuate plate may include, but not limited to, aluminium plastic shells, steel shells, aluminium shells or steel-aluminium alloy material shells. It should be understood that, although the shapes of the extension portions 102 and 122 on both sides of the first arcuate plate and the second arcuate plate in the arc length direction in FIG. 2 to FIG. 6 are respectively S-shaped curved surfaces firstly curved to the arcuate center and then back to the original arc length direction and extended arcuate surfaces along the arc length direction, and both comprise the screw holes 103 and 123, FIG. 3 to FIG. 6 are exemplary embodiments only used for exemplarily describing how to package the first arcuate plate and the second arcuate plate in the present application. Those skilled in the art may select extension portions 102 and 122 on both sides of different shapes according to the inspiration in the embodiment of the present application, and select to use different ways of combining the first arcuate plate and the second arcuate plate according to the actual demands, without being restricted thereby. For example, the extension portions 102 and 122 on both sides may be side planes or irregular flexible extension portions perpendicular to the arc length direction of the packaging housing. In addition, the inner arcuate surface 101 portion of the first arcuate plate and the outer arcuate surface 121 portion of the second arcuate plate may be continuously extended along the arc length direction of the packaging housing, wherein the multiple first arcuate electrode assemblies and the multiple second arcuate electrode assemblies may be respectively disposed abreast on the inner arcuate surface of the first arcuate plate and the outer arcuate surface of the second arcuate plate along the arc length direction of the packaging housing. In some embodiments of the present application, the first arcuate plate and the second arcuate plate may extend to form an approximately circular annular packaging housing.

In some embodiments of the present application, the curvature radius of the first arcuate electrode assembly and the second arcuate electrode assembly is greater than or equal to about 15 mm so as to satisfy the design requirements of a portable device worn by a human wrist or ankle. In some embodiments of the present application, the curvature radius of the first arcuate electrode assembly and the second arcuate electrode assembly is greater than or equal to about 20 mm.

In some embodiments of the present application, the curvature of the first arcuate plate and the curvature of the second arcuate plate may be respectively adjusted according to the curvature of the first arcuate electrode assembly and the second arcuate electrode assembly. For example, those skilled in the art may select a first arcuate plate with an appropriate curvature to match the curvature of the first arcuate electrode assembly and a second arcuate plate with an appropriate curvature to match the curvature of the second arcuate electrode assembly within the processing tolerance. The matching may include, but not limited to, the same curvature or the same arcuate center.

Figure 7:
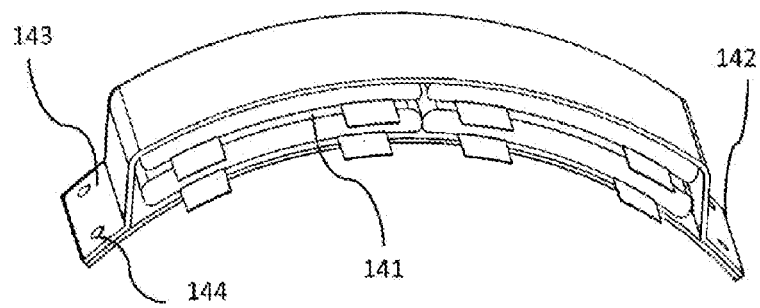
FIG. 7 illustrates a structural schematic view of a battery pack with openings on the both side that are not covered according to some embodiments of the present application.

FIG. 7 illustrates a structural schematic view of a battery pack with openings on the both sides that are not covered according to some embodiments of the present application. As illustrated in FIG. 7, the wing portions 142 and 143 combining the first arcuate plate and the second arcuate plate are formed by combining the extension portions 102 and 122 on both sides of the first arcuate plate and the second arcuate plate in the arc length direction of the packaging housing, wherein the upper half portion and the lower half portion of the electrode assembly are fixedly combined by the wing portions 142 and 143 by means of bolt through the screw hole 143 formed by aligning and combining the screw holes 103 and 123. The first arcuate plate, the second arcuate plate and the wing portions 142 and 143 jointly form the packaging housing of the battery pack, and define the openings on the both sides of the packaging housing, wherein the inner arcuate surface of the first arcuate electrode assembly in each set of electrode assemblies is opposite to the outer arcuate surface of the second arcuate electrode assembly, and a first spacing 141 exists between the inner arcuate surface of the first arcuate electrode assembly and the outer arcuate surface of the second arcuate electrode assembly. It should be understood that, although the means of combining the wing portions 142 and 143 of the packaging housing in FIG. 7 is a means of bolt, those skilled in the art may adopt any suitable combination means according to the actual needs, without being restricted thereby. In some embodiments of the present application, the means of combining the wing portions 142 and 143 includes, but is not limited to, bolts, rivets, hot pressing, bonding, welding or a combination thereof.

Figure 8:
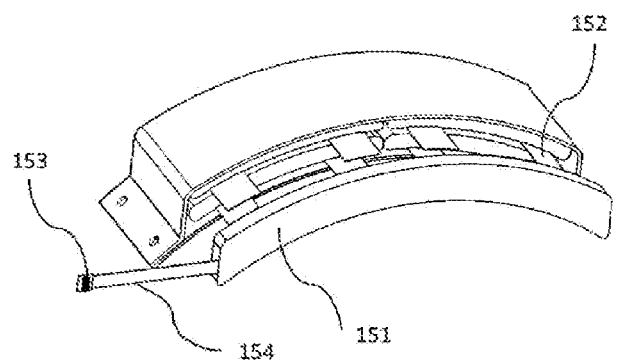
FIG. 8 illustrates a structural schematic view of a battery pack and a cover plate thereof according to some embodiments of the present application.
Figure 9:
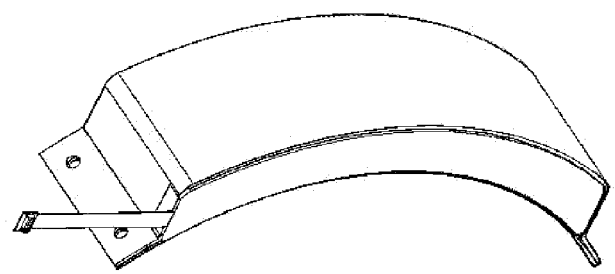
FIG. 9 illustrates a structural schematic view of a battery pack according to some embodiments of the present application.

FIG. 8 illustrates a structural schematic view of a battery pack and a cover plate thereof according to some embodiments of the present application. FIG. 9 illustrates a structural schematic view of a packaged battery pack according to some embodiments of the present application.

As illustrated in FIG. 8 and FIG. 9, the battery pack further comprises a cover plate 151, which may comprise a protection plate (not shown) disposed on the surface thereof, wherein the cover plate 151 covers one side opening of the packaging housing by means including, but not limited to, bonding or welding, wherein the first arcuate electrode assembly and the second arcuate electrode assembly can be electrically connected with the protection plate on the cover plate 151 through the tabs 152 thereof, and the first arcuate electrode assembly and the second arcuate electrode assembly are subjected to charge/discharge cycles by means of connecting wires 154 and an adapter 153 through a circuit configuration on the protection plate. In some embodiments of the present application, the electrical connection between the tabs 152 of the first arcuate electrode assembly and the second arcuate electrode assembly and the protection plate includes in series connection, parallel connection or a combination thereof.

Although the tabs 152 of the first arcuate electrode assembly and the second arcuate electrode assembly illustrated in FIG. 7 and FIG. 8 are disposed towards the same side opening, they are exemplary embodiments only used for describing the electrical connection between the tabs 152 and the protection plate, and those skilled in the art should understand that the tabs of the first arcuate electrode assembly and the second arcuate electrode assembly may be disposed according to the specific circuit configuration, without being restricted by the direction thereof. For example, the arrangement mode of the tabs of the first arcuate electrode assembly and the second arcuate electrode assembly includes, but is not limited to, that all tabs face towards one side opening of the packaging housing, the tabs are distributed and disposed on openings the both sides of the packaging housing or part of the tabs face towards the arc length direction of the packaging housing.

In some embodiments of the present application, the other side opening of the packaging housing may be packaged through the coverage of another cover plate. In other embodiments of the present application, the other side opening of the packaging housing may not be packaged in any form, or may be packaged by stacking the cover plate of another battery pack or through any other suitable packaging method in the art.

In some embodiments of the present application, the first arcuate electrode assembly and the second arcuate electrode assembly may be independently coiled or laminated electrode assemblies. For example, the arcuate electrode assemblies in the present application may be any conventional arcuate electrode assemblies in the art, which includes electrode assemblies with a laminated structure, a coiled structure or a multi-tab structure, all of which are included in the scope of the present application.

In some embodiments of the present application, the arcuate electrode assembly in the embodiment of the present application comprises a cathode containing a cathode material, an anode containing an anode material, and a separator, wherein the separator is disposed between the cathode and the anode.

In the above arcuate electrode assembly, the cathode comprises cathode materials capable of absorbing and releasing lithium (Li) (hereinafter sometimes referred to as "cathode materials capable of absorbing/releasing lithium Li"). Examples of the cathode materials capable of absorbing/releasing lithium (Li) may include one or more of lithium cobalt oxide, lithium nickel cobalt manganate, lithium nickel cobalt aluminate, lithium manganate, lithium ferric manganese phosphate, lithium vanadium phosphate, lithium vanadium oxide phosphate, lithium iron phosphate, lithium titanate and lithium-enriched manganese-based materials.

In the above-mentioned cathode materials, the chemical formula of lithium cobalt oxide may be $Li_xCo_aM1_bO_{2-c}$, where M1 is at least one selected from a group consisting of nickel (Ni), manganese (Mn), magnesium (Mg), aluminium (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr) and silicon (S), and values of x, a, b and c are respectively within the following ranges: $0.8 \leq x \leq 1.2$, $0.8 \leq a \leq 1$, $0 \leq b \leq 0.2$, $-0.1 \leq c \leq 0.2$.

In the above-mentioned cathode materials, the chemical formula of lithium nickel cobalt manganate or lithium nickel cobalt aluminate may be $Li_yNi_dM2_eO_{2-f}$, where M2 is at least one selected from a group consisting of cobalt (Co), manganese (Mn), magnesium (Mg), aluminium (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), zirconium (Zr) and silicon (Si), and values of y, d, e and f are respectively within the following ranges: $0.8 \le y \le 1.2$, $0.3 \le d \le 0.98$, $0.02 \le e \le 0.7$, $-0.1 \le f \le 0.2$.

In the above-mentioned cathode materials, the chemical formula of lithium manganate is $Li_zMn_{2-g}M3_gO_{4-h}$, where M3 is at least one selected from a group consisting of cobalt (Co), nickel (Ni), magnesium (Mg), aluminium (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W), and values of z, g and h are respectively within the following ranges: $0.8 \le z \le 1.2$, $0 \le g < 1.0$ and $-0.2 \le h \le 0.2$.

The anode comprises anode materials capable of absorbing and releasing lithium (Li) (hereinafter sometimes referred to as "anode materials capable of absorbing/releasing lithium Li"). Examples of the anode materials capable of absorbing/releasing lithium (Li) may include carbon materials, metal compounds, oxides, sulfides, lithium nitrides such as $LiN_3$, lithium metal, metals that form alloys together with lithium, and polymer materials.

Examples of the carbon materials may include low graphitized carbon, easily graphitized carbon, synthetic graphite, natural graphite, mesophase carbon microspheres, soft carbon, hard carbon, pyrolytic carbon, coke, glass carbon, organic polymer compound sintered bodies, carbon fibers and activated carbon, wherein coke may include pitch coke, needle coke and petroleum coke; organic polymer compound sintered bodies refer to materials obtained by sintering to carbonize polymer materials such as phenol plastics or furan resins at an appropriate temperature, and some of these materials are divided into low graphitized carbon or easily graphitized carbon; and examples of polymer materials may include polyacetylene and polypyrrole.

In addition, anode materials capable of absorbing/releasing lithium (Li) may include elemental lithium metal, metallic elements and semi-metallic elements capable of forming alloys with lithium (Li), including alloys and compounds of such elements, etc. For example, they can be used with carbon materials, because in this case, good cycling characteristics and high energy density can be obtained. In addition to alloys containing two or more metallic elements, the alloys used here also include alloys containing one or more metallic elements and one or more semi-metallic elements. The alloy may be in the following states: solid solution, eutectic crystal (eutectic mixture), intermetallic compound and mixture thereof.

Examples of the metallic and semi-metallic elements may include tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y) and hafnium (Hf). Examples of the alloys and compounds may include materials with a chemical formula $Ma_sMb_tLi_u$ and materials with a chemical formula $Ma_pMc_qMd_r$. In these chemical formulas, Ma denotes at least one of the metallic and semi-metallic elements capable of forming alloys with lithium; Mb denotes at least one of the metallic and semi-metallic elements except lithium and Ma; Mc denotes at least one of the non-metallic elements; Md denotes at least one of the metallic and semi-metallic elements except Ma; and s, t, u, p, q and r satisfy $s>0$, $t \ge 0$, $u \ge 0$, $p>0$, $q>0$ and $r \ge 0$.

In addition, inorganic compounds containing no Li, such as $MnO_2$, $V_2O_5$, $V_6O_{13}$, NiS and MOS, may be used in the anode.

The separator in some embodiments of the present application includes, but is not limited to, at least one of polyethylene, polypropylene, polyethylene glycol terephthalate, polyimide and aramid. For example, polyethylene includes at least one component selected from a group consisting of high-density polyethylene, low-density polyethylene and ultra-high molecular weight polyethylene. Especially for polyethylene and polypropylene, they have a good effect on preventing short circuits, and can improve the stability of batteries through a turn-off effect.

The surface of the separator may also include a porous layer, which is disposed on at least one surface of the separator. The porous layer comprises an inorganic particle and a binder. The inorganic particle is one or a combination of more selected from a group consisting of alumina ($Al_2O_3$), silicon oxide ($SiO_2$), magnesium oxide (MgO), titanium oxide ($TiO_2$), hafnium dioxide ($HfO_2$), tin oxide ($SnO_2$), cerium dioxide ($CeO_2$), nickel oxide (NiO), zinc oxide (ZnO), calcium oxide (CaO), zirconia ($ZrO_2$), yttrium oxide ($Y_2O_3$), silicon carbide (SiC), boehmite, aluminium hydroxide, magnesium hydroxide, calcium hydroxide and barium sulfate. The binder is one or a combination of more selected from a group consisting of polyvinylidene fluoride, vinylidene fluoride-hexafluoropropylene copolymer, polyamide, polyacrylonitrile, polyacrylic ester, polyacrylic acid, polyacrylate, sodium carboxymethyl cellulose, polyvinylpyrrolidone, polyvinyl ether, polymethyl methacrylate, polytetrafluoroethylene and polyhexafluoropropylene.

The porous layer can improve heat resistance, oxidation resistance and electrolyte wettability of the separator, and enhance the adhesiveness between the separator and the cathode or the anode.

The arcuate electrode assemblies in the present application may be manufactured by adopting a traditional method known to those skilled in the art. For example, in some embodiments of the present application, the cathode, the separator and the anode are coiled or stacked in sequence to form the electrode assemblies.

The above description summarizes the features of several embodiments, which will enable a person of ordinary skill in the art to understand the various aspects of the present application. A person of ordinary skill in the art can readily use this application as a basis for designing or modifying other compositions to achieve the same objectives and/or the same advantages as the embodiments herein. It is also to be understood by a person of ordinary skill in the art that these equal examples do not depart from the spirit and scope of the present application, and it is possible to make various changes, substitutions and modifications to the present application without departing from the spirit and scope of the present application. Although the methods disclosed herein have been described with reference to the specific operations that are carried out in a specific order, it should be understood that these operations can be combined, subdivided, or reordered to form an equivalent method without departing from the teachings of the present application. Therefore, the order and grouping of operations are not a limitation to the present application unless specifically indicated herein.

What is claimed is:

1. A battery pack, comprising: a packaging housing, comprising a first arcuate plate and a second arcuate plate, an inner arcuate surface of the first arcuate plate facing an outer arcuate surface of the second arcuate plate; and at least one set of electrode assemblies, comprising a first arcuate electrode assembly and a second arcuate electrode assembly; wherein the first arcuate electrode assembly is disposed on the inner arcuate surface of the first arcuate plate; the second arcuate electrode assembly is disposed on the outer arcuate surface of the second arcuate plate; the inner arcuate surface of the first arcuate electrode assembly and the outer arcuate surface of the second arcuate electrode assembly face each other; and a first spacing is defined between the inner arcuate surface of the first arcuate electrode assembly and the outer arcuate surface of the second arcuate electrode assembly;

wherein the first spacing is about 5%-about 20% of the sum of the thickness of the first arcuate electrode assembly and the thickness of the second arcuate electrode assembly.

2. The battery pack according to claim 1, wherein the thickness of the first arcuate electrode assembly and the thickness of the second arcuate electrode assembly are respectively about 1 mm-about 10 mm.

3. The battery pack according to claim 2, wherein the thickness of the first arcuate electrode assembly and the thickness of the second arcuate electrode assembly are respectively about 2 mm-about 6 mm.

4. The battery pack according to claim 1, wherein the at least one set of electrode assemblies comprises a plurality of sets of electrode assemblies disposed abreast along an arc length direction of the packaging housing, each of the plurality of sets of electrode assemblies has a second spacing from its adjacent set of the electrode assembles in the arc length direction.

5. The battery pack according to claim 4, wherein the second spacing is about 1 mm-about 15 mm.

6. The battery pack according to claim 5, wherein the second spacing is about 3 mm-about 8 mm.

7. The battery pack according to claim 1, wherein the curvature radius of the first arcuate electrode assembly and the second arcuate electrode assembly is at least about 15 mm.

8. The battery pack according to claim 7, wherein the curvature radius of the first arcuate electrode assembly and the second arcuate electrode assembly is at least about 20 mm.

9. The battery pack according to claim 1, wherein the curvature of the first arcuate electrode assembly matches the curvature of the first arcuate plate.

10. The battery pack according to claim 1, wherein the curvature of the second arcuate electrode assembly matches the curvature of the second arcuate plate.

11. The battery pack according to claim 1, wherein the packaging housing further comprises a wing portion combining the first arcuate plate and the second arcuate plate, and the first arcuate plate, the second arcuate plate and the wing portion define openings on both sides of the packaging housing.

12. The battery pack according to claim 11, wherein the wing portion comprises a first wing portion adhered to the first arcuate plate and a second wing portion adhered to the second arcuate plate, wherein the first wing portion and the second wing portion is combined by one or more of the following methods: bolt fastening, rivets fastening, hot pressing, bonding and welding the means of forming the wing portion comprise bolts, rivets, hot pressing, bonding, and welding.

13. The battery pack according to claim 11, further comprising a cover plate, wherein the cover plate covers the opening on one side of the packaging housing.

14. The battery pack according to claim 13, wherein the first arcuate electrode assembly and the second arcuate electrode assembly each comprises at least one tab, and the at least one tab is electrically connected with a protection plate on the cover plate.

15. The battery pack according to claim 1, wherein the first arcuate plate further comprises extension portions on both sides in the arc length direction of the packaging housing, and screw holes used for fixing the extension portions.

16. The battery pack according to claim 1, wherein the first arcuate electrode assembly is fixed on the inner arcuate surface of the first arcuate plate by means of binder or double-sided adhesive.

17. The battery pack according to claim 1, wherein the first arcuate plate and the second arcuate plate comprise aluminium plastic shells, steel shells, aluminium shells or steel-aluminium alloy material shells.

18. The battery pack according to claim 1, wherein the first arcuate electrode assembly and the second arcuate electrode assembly respectively comprise: a cathode; an anode; and a separator, disposed between the cathode and the anode.

\* \* \* \* \*